(12) United States Patent
Nguyen et al.

(10) Patent No.: US 7,986,736 B2
(45) Date of Patent: Jul. 26, 2011

(54) ULTRA WIDEBAND BASEBAND CHIP WITH INTELLIGENT ARRAY RADIO AND METHOD OF USE THEREOF

(75) Inventors: Hung C. Nguyen, San Jose, CA (US); Catherine A. French, Olympis, WA (US); Jayesh Desai, Milpitas, CA (US); Ruoyang Lu, Milpitas, CA (US); Ali D. Pirooz, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 1140 days.

(21) Appl. No.: 11/467,914

(22) Filed: Aug. 28, 2006

(65) Prior Publication Data
US 2007/0058736 A1    Mar. 15, 2007

Related U.S. Application Data

(60) Provisional application No. 60/716,725, filed on Sep. 12, 2005.

(51) Int. Cl.
*H04K 1/10*    (2006.01)
(52) U.S. Cl. .................................. 375/260; 375/343
(58) Field of Classification Search .............. 375/260, 375/343; 455/59; 370/69.1; 714/786, 794, 714/795
See application file for complete search history.

(56) References Cited

U.S. PATENT DOCUMENTS

| | | | |
|---|---|---|---|
| 5,105,195 A * | 4/1992 | Conrad ............... | 342/174 |
| 5,361,276 A * | 11/1994 | Subramanian ........... | 375/150 |
| 5,705,949 A * | 1/1998 | Alelyunas et al. ........ | 329/304 |
| 5,848,097 A * | 12/1998 | Carney et al. .......... | 375/219 |
| 6,580,705 B1 * | 6/2003 | Riazi et al. ............ | 370/347 |
| 6,664,921 B2 * | 12/2003 | Pratt .................. | 342/357.06 |
| 6,683,493 B1 * | 1/2004 | Fujimora et al. ........ | 329/304 |
| 7,099,679 B2 * | 8/2006 | Rainish et al. .......... | 455/506 |
| 7,158,562 B2 * | 1/2007 | Molina Navarro et al. .. | 375/219 |
| 7,551,907 B2 * | 6/2009 | French et al. .......... | 455/234.1 |
| 7,584,410 B2 * | 9/2009 | Ahn .................... | 714/799 |
| 7,649,833 B2 * | 1/2010 | Sadri et al. ........... | 370/208 |
| 2003/0054851 A1 * | 3/2003 | Jo et al. ............... | 455/522 |
| 2003/0133467 A1 * | 7/2003 | Molina Navarro et al. .. | 370/431 |
| 2004/0066737 A1 * | 4/2004 | Sakaishi ............... | 370/206 |
| 2004/0190438 A1 * | 9/2004 | Maltsev et al. ......... | 370/206 |
| 2004/0264600 A1 * | 12/2004 | Kao et al. ............. | 375/316 |
| 2005/0141412 A1 | 6/2005 | Sadri et al. | |

(Continued)

FOREIGN PATENT DOCUMENTS
WO    2005067171 A1    7/2005

OTHER PUBLICATIONS

Sever et al., A Dual-Antenna Phase-Array Ultra-Wideband CMOS Transceiver, IEEE Communications Magazine, Aug. 2006, IEEE, USA.

*Primary Examiner* — Shuwang Liu
*Assistant Examiner* — Helene Tayong
(74) *Attorney, Agent, or Firm* — Perkins Coie LLP (57) ABSTRACT

An ultra wideband receiver, based on multiband orthogonal frequency division multiplexing (MB-OFDM), combines digital data from multiple channels after signal processing and before decoding. The receiver provides a master controller that synthesizes packet synchronization, frame synchronization, and sampling frequency offset information from multiple channels into signals that simultaneously control all channels of the receiver.

17 Claims, 11 Drawing Sheets

U.S. PATENT DOCUMENTS

| | | | |
|---|---|---|---|
| 2005/0260999 A1* | 11/2005 | Csapo | 455/452.2 |
| 2006/0073802 A1 | 4/2006 | Chari et al. | |
| 2007/0002981 A1* | 1/2007 | Gaikwad et al. | 375/346 |
| 2007/0058623 A1* | 3/2007 | Moorti et al. | 370/389 |
| 2007/0071036 A1* | 3/2007 | Okunev et al. | 370/503 |
| 2008/0159424 A1* | 7/2008 | Hoo et al. | 375/260 |

* cited by examiner

ULTRA WIDEBAND BASEBAND CHIP WITH INTELLIGENT ARRAY RADIO AND METHOD OF USE THEREOF

PRIORITY REFERENCE TO PRIOR APPLICATIONS

This application claims benefit of and incorporates by reference U.S. patent application Ser. No. 60/716,725, entitled "ULTRA-WIDEBAND BASEBAND CHIP WITH INTELLIGENT ARRAY RADIO," filed on Sep. 12, 2005, by inventors Hung C. NGUYEN et al.

TECHNICAL FIELD

This invention relates generally to wireless receivers, and more particularly, but not exclusively, provides an ultra wideband communications multiband orthogonal frequency division multiplexing (MB-OFDM) receiver.

BACKGROUND

A physical layer (PHY) standard for MB-OFDM was developed by an industry consortium called the WiMedia Alliance. This standard was proposed for IEEE 802.15.3a Personal Area Networks and can be found on the WiMedia Alliance website: www.wimedia.org.

The WiMedia standard provides a description of the requirements for MB-OFDM transmitted signals, but leaves the receiver details up to the implementer. For this reason, a robust receiver design is needed.

SUMMARY

In an embodiment of the invention, a receiver comprises a plurality of channels. Each channel has an analog-to-digital converter for in-phase (I) signal and an analog-to-digital converter for quadrature (Q) signal. Each channel also has a signal processing block coupled to the I and Q analog-to-digital converters. Coupled to the signal processing blocks is a data combiner that combines the I and Q signals separately from each channel.

In an embodiment of the invention, a method comprises: for a plurality of channels, converting from analog to digital an in-phase (I) signal and a quadrature (Q) signal; signal processing each converted signal to produce data and control signals; after the processing, combining the control signals to create a set of master controls for the receiver; after the processing, combining the data signals from each channel; and decoding the combined signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
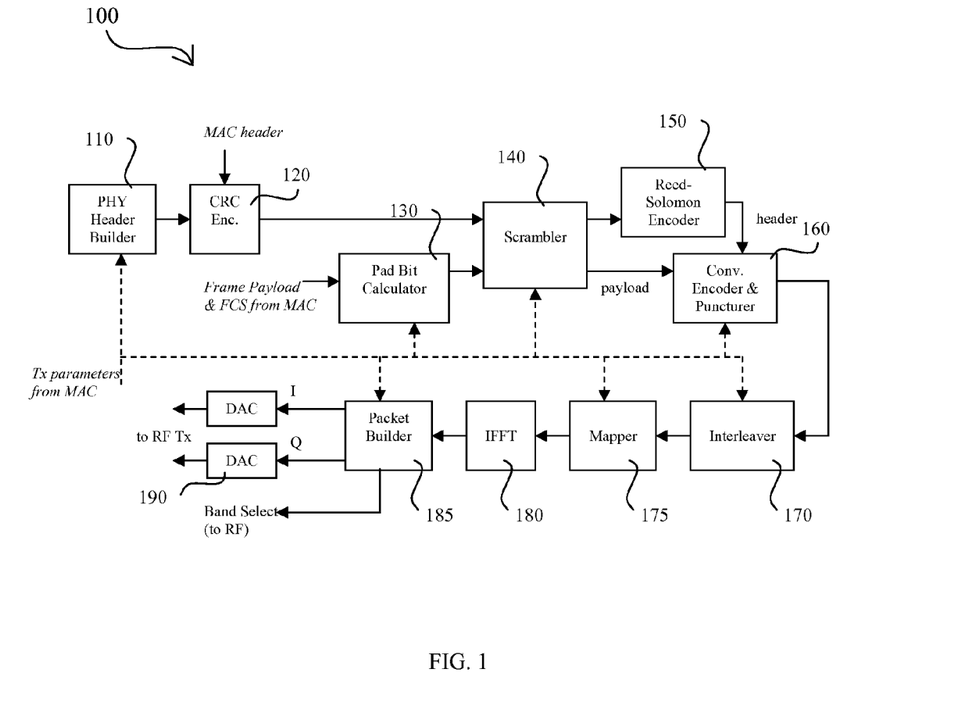
FIG. 1 is a block diagram illustrating a transmitter portion according to an embodiment of the present invention.

FIG. 1 is a block diagram illustrating a transmitter portion 100 according to an embodiment of the present invention. The transmitter and receiver are integrated into the same chip. The Media Access Control layer (MAC) provides control information that enters the PHY header builder 110, which is coupled to the cyclic redundancy check (CRC) encoder 120. The MAC provides additional header information to the CRC encoder 120. The CRC encoder 120 calculates and appends a cyclic redundancy check to the combined header. The CRC block 120 is coupled to a scrambler 140, which is in turn coupled to a Reed-Solomon encoder 150. The modified header out of the Reed-Solomon encoder 150 is then ready for the convolutional encoder and puncturer 160. The user data or payload itself follows a somewhat different path to the convolutional encoder 160. Specifically, the payload from the MAC first enters a pad bit calculator 130 to determine how many bits to append to obtain the appropriate frame size for the interleaver 170. The data then enters the scrambler 140, followed by the convolutional encoder and puncturer 160. Both data and header then follow the same path through the interleaver 170 and mapper 175. OFDM modulation is accomplished via the use of an inverse fast Fourier transform (IFFT) 180, which is further coupled to a packet builder 185. The packet builder 185 assembles the preamble, header and payload, which are then sent through the digital-to-analog converters (DACs) 190 and on to the analog radio frequency (RF) transmitter. The packet builder 185 produces a band select signal to the RF transmitter to enable band hopping (i.e., varying of the transmission frequency to enable multi-user communications).

Figure 2:
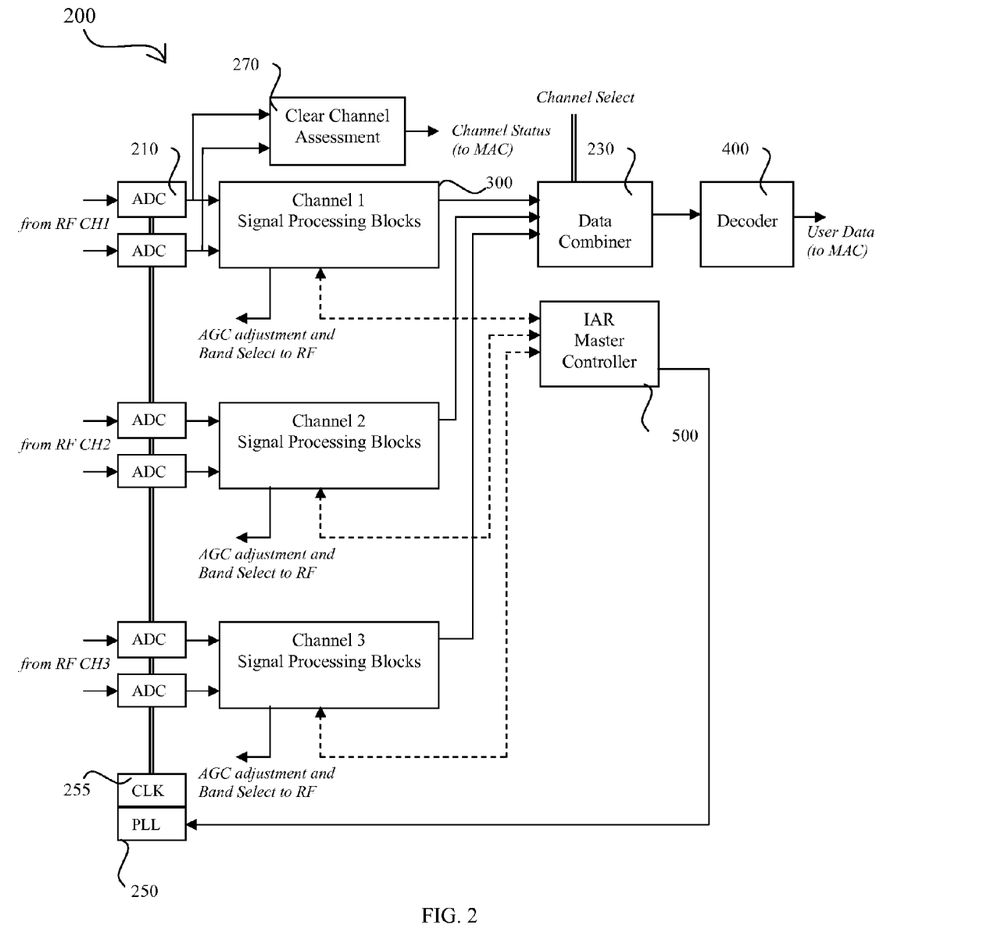
FIG. 2 is a block diagram illustrating an intelligent array radio (IAR) receiver according to an embodiment of the present invention.

FIG. 2 is a block diagram illustrating an intelligent array radio (JAR) receiver 200 according to an embodiment of the present invention. This is a multi-channel receiver, with 3 channels shown for this embodiment. Signals from an analog radio frequency (RF) multi-channel receiver enter identical analog-to-digital converters (ADCs) 210. There are two ADCs 210 per channel, one for the in-phase (I) signal and one for the quadrature (Q) signal. The ADCs are coupled to signal processing blocks 300 for each channel. The signal processing blocks 300 provide control information to the RF receivers regarding gain control and band selection for frequency hopping. The data outputs of the signal processing blocks 300 are coupled to a data combiner 230, which combines the data values from each channel (I and Q separately) into a single data stream. The data combiner 230 is controlled by a channel select signal that indicates which channels are enabled, and thus determines which signals are combined. In an embodiment, all available channels are enabled and combined. However, any combination of channels can be enabled for diagnostic purposes, or to save power in the chip. There are a number of combining techniques that can be employed. For example, the data combiner 230 could select the best channel in terms of signal-to-noise ratio (SNR) (e.g., highest SNR); or it could perform a simple average of the signals from each channel; or it could perform a weighted average of the signals from each channel, with weights based on SNR. The data combiner 230 is coupled to the back end decoder 400, which produces the user data to be sent to the Media Access Control layer (MAC). The location of the data combiner 230 after the signal processing blocks 300 ensures that data on all channels are optimally processed to achieve appropriate gain and phase before they are combined and then decoded. The signal processing blocks 300 are also coupled to the IAR master controller 500, which processes synchronization information and sampling frequency offset estimates from each channel in order to control all channels of the receiver. The IAR master controller 500 provides feedback to the phase-locked loop 250 controlling the ADC clock 255 for control of the clock phase in order to compensate for sampling frequency offset. The ADCs 210 for channel 1 are also coupled to the clear channel assessment block 270, which is controlled via signals from the MAC. This block is employed by the MAC to determine if the over-air channel is clear for transmission.

Figure 3:
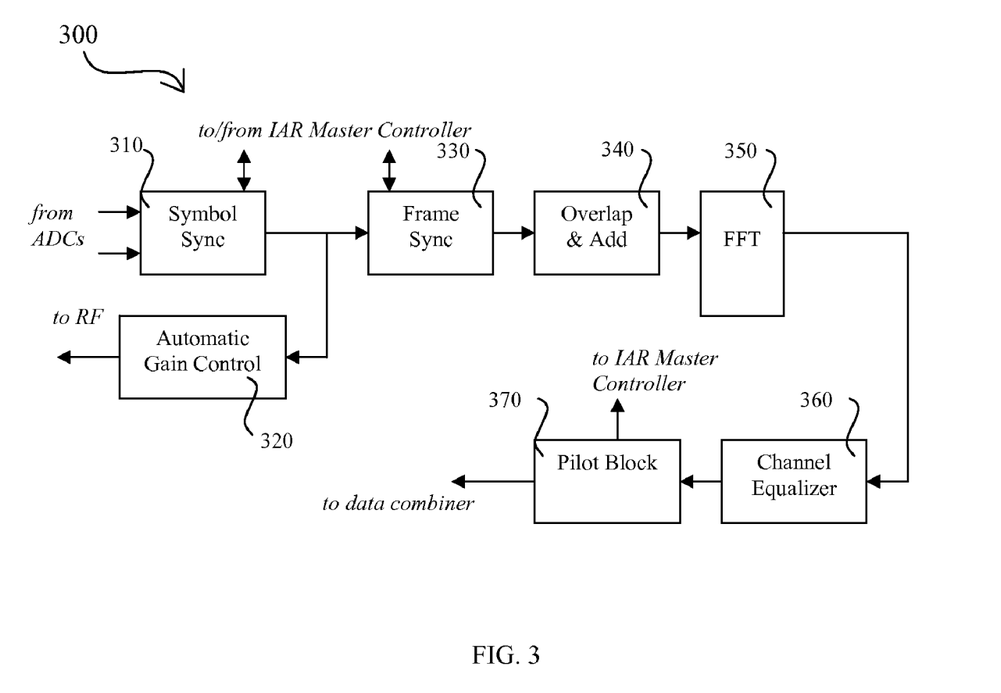
FIG. 3 is a block diagram illustrating signal processing blocks, which are duplicated for each channel in the receiver.

FIG. 3 is a block diagram illustrating the signal processing blocks 300, which are duplicated for each channel in the receiver. The ADC outputs enter a symbol synchronization block 310, which correlates the incoming signal with the known preamble. Details of the operation of the symbol sync block 310 used for this design can be found in U.S. patent application Ser. No. 11/288,879 filed Nov. 28, 2005, which is hereby incorporated by reference. The symbol sync correlation values are sent to the IAR master controller 500 for further processing. The data from the symbol sync 310 is coupled to an automatic gain control (AGC) 320, which provides feedback to the RF receiver regarding desired amplifier gain levels. Details of the AGC 320 used in this design can be found in U.S. patent application Ser. No. 11/423,145, filed Jun. 8, 2006, which is hereby incorporated by reference. Automatic gain control is provided for each of the 3 channels, and for each frequency band individually. The symbol sync 310 is also coupled to a frame synchronization block 330, which calculates a signal autocorrelation and passes the phase difference of this correlation to the IAR master controller 500 for further processing. After frame sync 330, the data enter an overlap-and-add 340, which compensates for any remaining timing misalignment. The overlap-and-add 340 is coupled to the fast Fourier transform (FFT) 350, which accomplishes OFDM demodulation. The FFT 350 on channel 1 is shared with the transmit side where it is used as the IFFT 180. The FFT 350 output is coupled to the channel equalizer 360, which is in turn coupled to the pilot block 370. The pilot block includes both carrier frequency offset (CFO) correction and sampling frequency offset (SFO) correction. Details regarding the SFO method used in this design can be found in U.S. patent application Ser. No. 11/467,158 filed Aug. 24, 2006, which is hereby incorporated by reference. The output of the pilot block 370 for each channel goes into the data combiner 230. The pilot block 370 for each channel also provides an SFO phase estimate to the IAR master controller 500.

Figure 4:
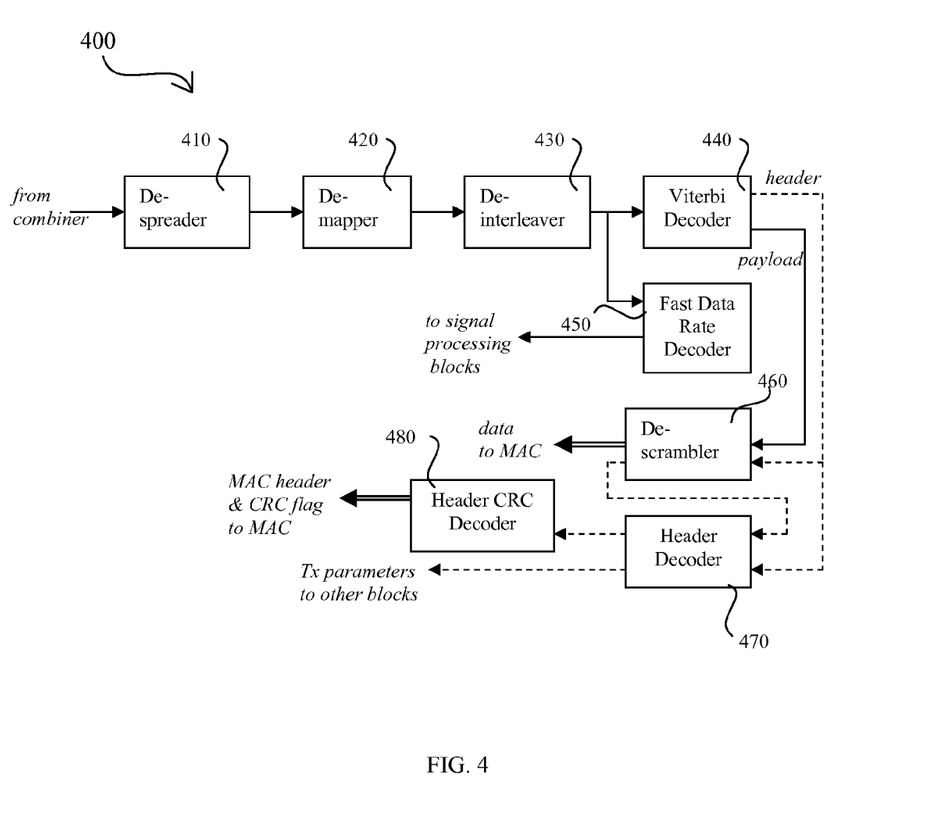
FIG. 4 is a block diagram illustrating a back end decoder that reverses the encoding functions of the transmitter.

FIG. 4 is a block diagram illustrating the back end decoder 400 that reverses the encoding functions of the transmitter. The data combiner 230 output enters the despreader 410, which averages the duplicate samples transmitted. The despreader 410 is coupled to the demapper 420, which maps the samples to soft-decision values required by the Viterbi decoder 440. The demapper 420 is coupled to the deinterleaver 430, which is in turn coupled to the Viterbi decoder 440. The deinterleaver 430 is also coupled to the fast data rate decoder 450, which operates in parallel with the Viterbi decoder 440 to decode the front end of the header more quickly than the Viterbi decoder 440. Details on the fast data rate decoder 450 can be found in U.S. patent application Ser. No. 11/278,536 filed Apr. 3, 2006, which is hereby incorporated by reference. The Viterbi decoder 440 is coupled to the descrambler 460 and the header decoder 470. The descrambler 460 output includes the decoded user data to the MAC, and also header information that needs further processing by the header decoder 470 and the header CRC decoder 480. These blocks produce header and control information to the MAC.

Figure 5:
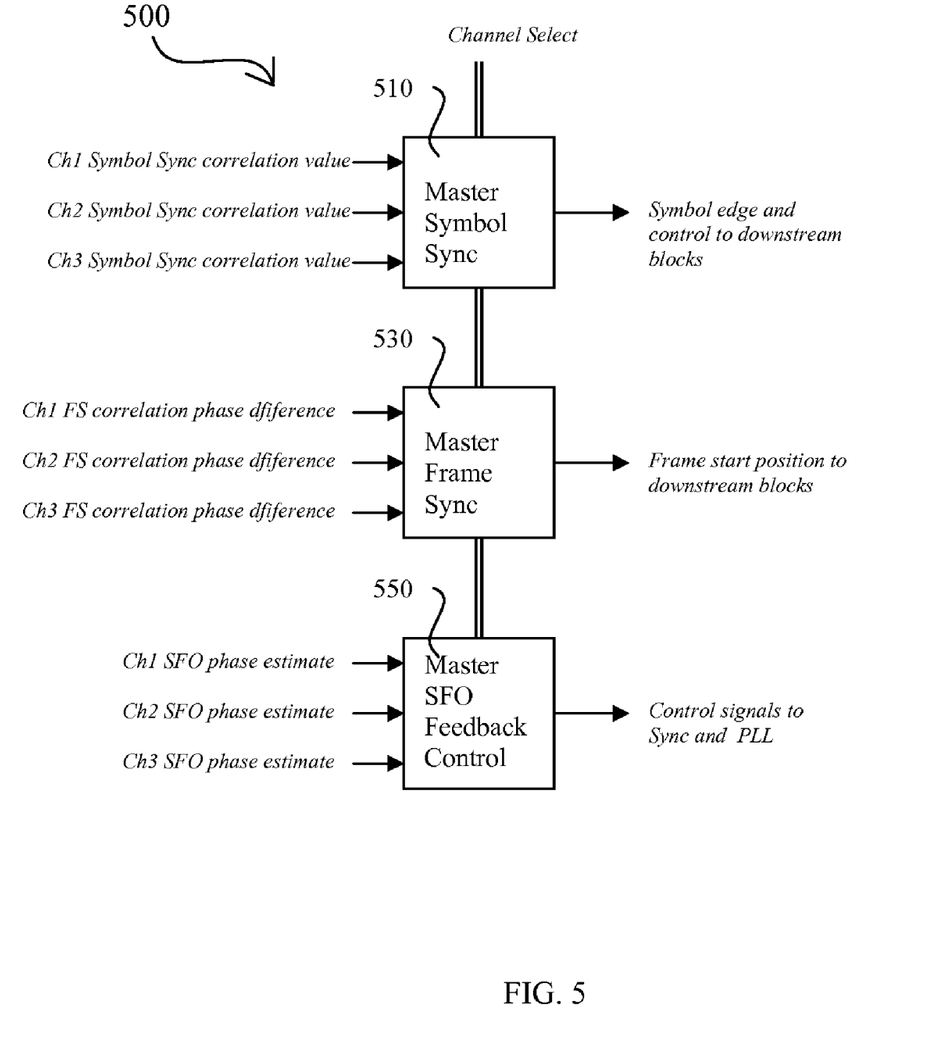
FIG. 5 is a block diagram illustrating an IAR master controller, which processes synchronization and sampling frequency offset information from each of the 3 receiver paths.
Figure 6A:
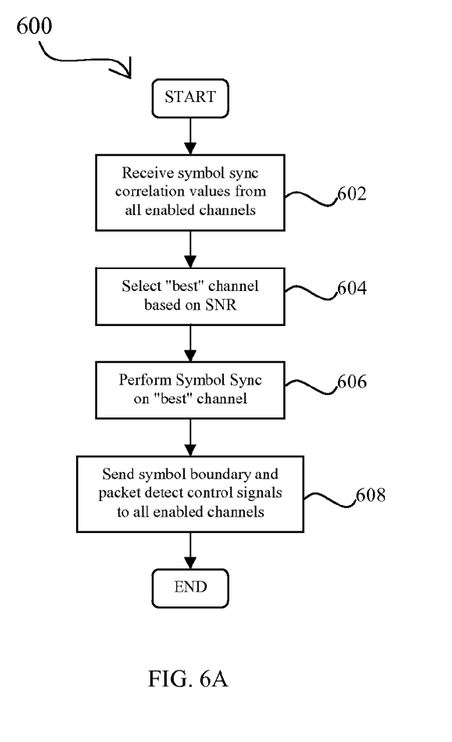
FIG. 6A is a flowchart illustrating a first method of performing multi-channel symbol synchronization.

FIG. 5 is a block diagram illustrating the IAR master controller 500, which processes synchronization and sampling frequency offset information from each of the 3 receiver paths into a single set of control signals for the receiver. Symbol synchronization correlation values from each path are coupled to a master symbol sync block 510, which processes the incoming correlation values to produce symbol boundary and packet detection control information to the downstream blocks. The master symbol sync block 510 is controlled by the same channel select signal that controls the data combiner 230. The channel select signal indicates which channels are enabled, and thus determines which values are processed. In an embodiment, all available channels are enabled and processed, but any combination of channels can be enabled for diagnostic purposes or to save power in the chip. Also entering the IAR master controller are correlation phase differences from each channel for frame synchronization. These signals enter the master frame synchronization block 530, also controlled by the channel select signal. The master frame sync block 530 determines the start of the channel estimation symbols, header symbols and data symbols within the packet. This information is used to enable downstream blocks that process these symbols, starting with the overlap-and-add block 340. Finally, sampling frequency offset (SFO) estimates from each channel enter the master SFO feedback control block 550, also controlled by the channel select signal. The master SFO feedback control block provides control information to the symbol sync block 310 and the PLL 250 that controls the sampling clock 255. Details of the method used for sampling frequency offset correction can be found in U.S. patent application Ser. No. 11/467,158. FIG. 6A is a flowchart illustrating a first method 600 that can be implemented in the master symbol sync block 510. There are a number of methods that could be used, and four possibilities will be described here. The first method begins when symbol synchronization correlation values from each enabled channel are received 602 by the master symbol sync block 510. The "best" channel is selected based on some criterion such as SNR 604. Symbol sync is then performed on the "best" channel 606 using any symbol sync method desired, such as that described in U.S. patent application Ser. No. 11/288,879. The resulting symbol boundary and packet detect control signals are sent to all channels 608, and then the method ends.

Figure 6B:
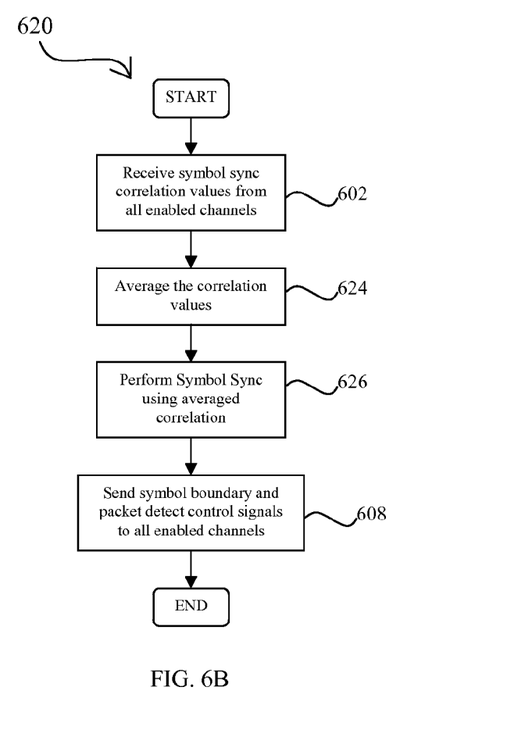
FIG. 6B is a flowchart illustrating a second method of performing multi-channel symbol synchronization.

FIG. 6B is a flowchart illustrating a second method 620 that can be implemented in the master symbol sync block 510. Symbol synchronization correlation values from each enabled channel are received 602 by the master symbol sync block 510. The correlation values from the enabled channels are averaged 624 using a simple average or weighted average. Symbol sync is then performed based on the averaged correlation 626 using any symbol sync method desired, such as that described in U.S. patent application Ser. No. 11/288,879. The resulting symbol boundary and packet detect control signals are sent to all channels 608, and then the method ends.

Figure 6C:
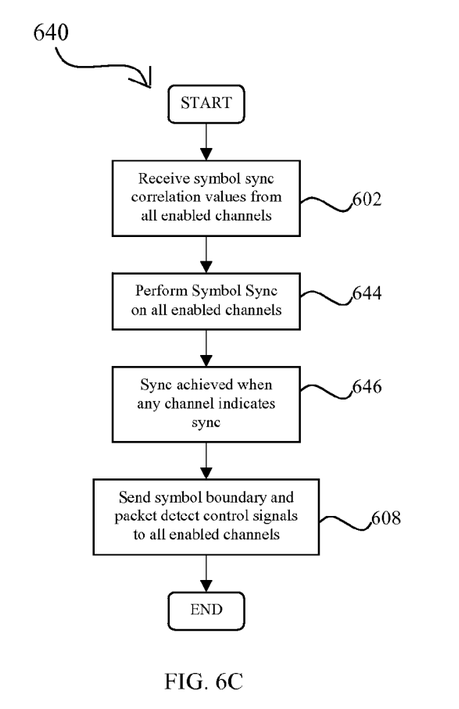
FIG. 6C is a flowchart illustrating a third method of performing multi-channel symbol synchronization.

FIG. 6C is a flowchart illustrating a third method 640 that can be implemented in the master symbol sync block 510. Symbol synchronization correlation values from each enabled channel are received 602 by the master symbol sync block 510. Symbol sync is performed separately on each enabled channel 644 using any symbol sync method desired, such as that described in U.S. patent application Ser. No. 11/288,879. Sync is consider to be achieved for the receiver when any one channel indicates sync 646. The resulting symbol boundary and packet detect control signals are sent to all channels 608, and then the method ends.

Figure 6D:
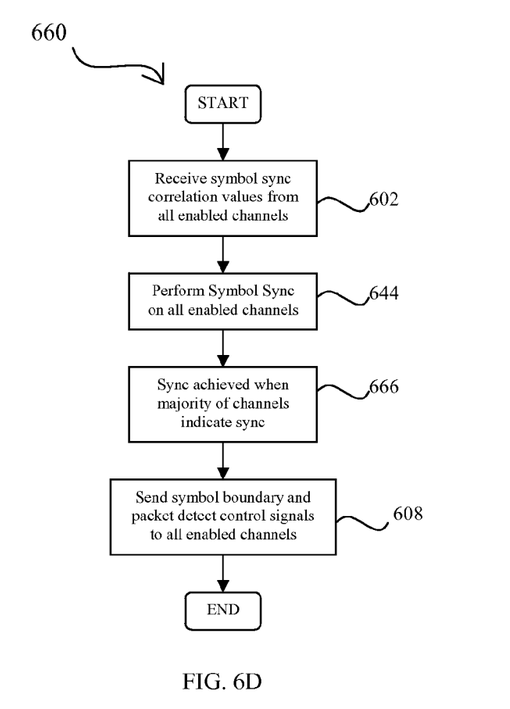
FIG. 6D is a flowchart illustrating a fourth method of performing multi-channel symbol synchronization.

FIG. 6D is a flowchart illustrating a fourth method 660 that can be implemented in the master symbol sync block 510. Symbol synchronization correlation values from each enabled channel are received 602 by the master symbol sync block 510. Symbol sync is performed separately on each enabled channel 644 using any symbol sync method desired, such as that described in U.S. patent application Ser. No. 11/288,879. Sync is consider to be achieved for the receiver when a majority of enabled channels indicate sync at roughly the same time 666. The resulting symbol boundary and packet detect control signals are sent to all channels 608, and then the method ends.

Figure 7A:
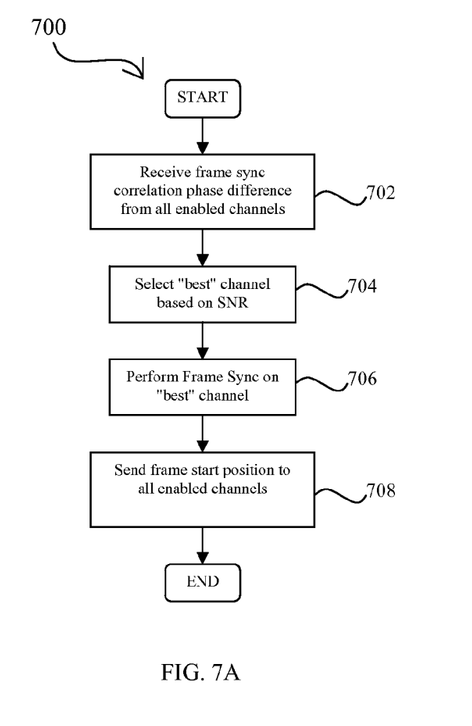
FIG. 7A is a flowchart illustrating a first method of performing multi-channel frame synchronization.

FIG. 7A is a flowchart illustrating a first method 700 that can be implemented in the master frame sync block 530. There are a number of methods that could be used, and four possibilities will be described here. The first method begins when frame synchronization correlation phase differences from each enabled channel are received 702 by the master frame sync block 530. The "best" channel is selected based on some criterion such as SNR 704. Frame sync is then performed on the "best" channel 706 using any frame sync method desired, such as testing for a large phase difference. The resulting frame start position is sent to all channels 708, and then the method ends.

Figure 7B:
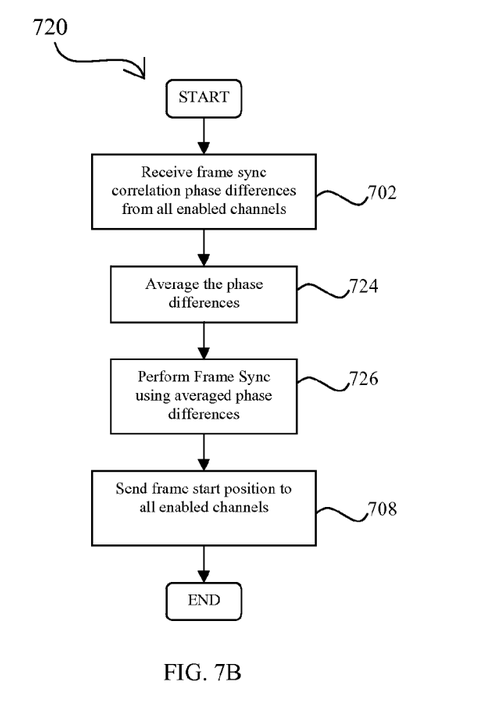
FIG. 7B is a flowchart illustrating a second method of performing multi-channel frame synchronization.

FIG. 7B is a flowchart illustrating a second method 720 that can be implemented in the master frame sync block 720. Frame synchronization correlation phase differences from each enabled channel are received 702 by the master frame sync block 530. The correlation phase differences from the enabled channels are averaged 724 using a simple average or weighted average. Frame sync is then performed based on the averaged phase differences 726 using any frame sync method desired, such as testing for a large phase difference. The resulting frame start position is sent to all channels 708, and then the method ends.

Figure 7C:
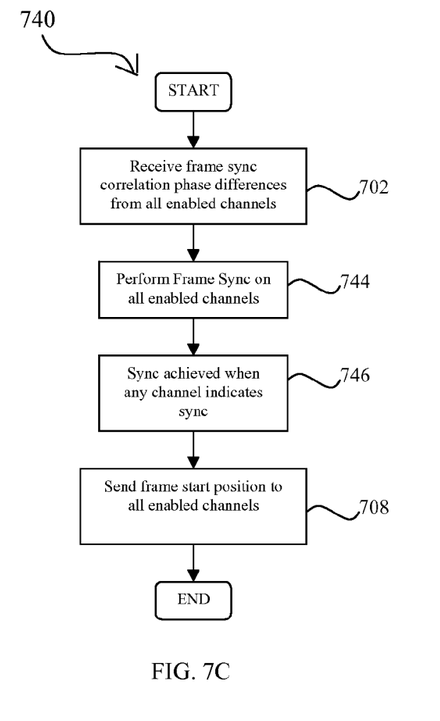
FIG. 7C is a flowchart illustrating a third method of performing multi-channel frame synchronization.

FIG. 7C is a flowchart illustrating a third method 740 that can be implemented in the master frame sync block 530. Frame synchronization correlation phase differences from each enabled channel are received 702 by the master frame sync block 530. Frame sync is performed separately on each enabled channel 744 using any frame sync method desired, such as testing for a large phase difference. Sync is consider to be achieved for the receiver when any one channel indicates sync 746. The resulting frame start position is sent to all channels 708, and then the method ends.

Figure 7D:
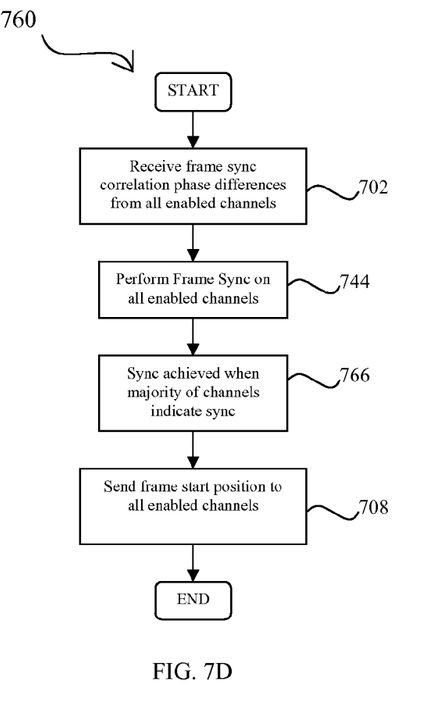
FIG. 7D is a flowchart illustrating a fourth method of performing multi-channel frame synchronization.

FIG. 7D is a flowchart illustrating a fourth method 760 that can be implemented in the master frame sync block 530. Frame synchronization correlation phase differences from each enabled channel are received 702 by the master frame sync block 530. Frame sync is performed separately on each enabled channel 744 using any frame sync method desired, such as testing for a large phase difference. Sync is consider to be achieved for the receiver when a majority of enabled channels indicate sync at roughly the same time 766. The resulting frame start position is sent to all channels 708, and then the method ends.

Figure 8A:
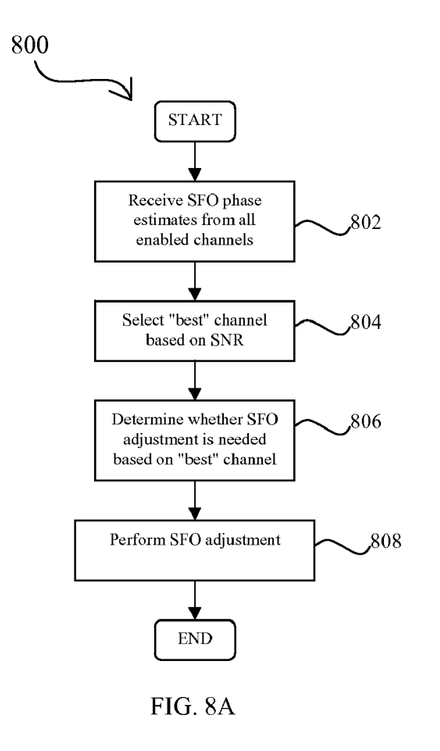
FIG. 8A is a flowchart illustrating a first method of performing multi-channel sampling frequency offset adjustment.

FIG. 8A is a flowchart illustrating a first method 800 of combining SFO phase estimates in the master SFO feedback control block 550. There are a number of methods that could be used, and two possibilities are described here. The first method begins when SFO phase estimates from each enabled channel are received 802 by the master SFO feedback control block 550. The "best" channel is selected based on some criterion such as SNR 804. A determination is made as to whether a SFO adjustment is needed based on the "best" channel 806 using any method desired, such as that described in U.S. patent application Ser. No. 11/467,158. The SFO adjustment is then performed 808, and then the method ends.

Figure 8B:
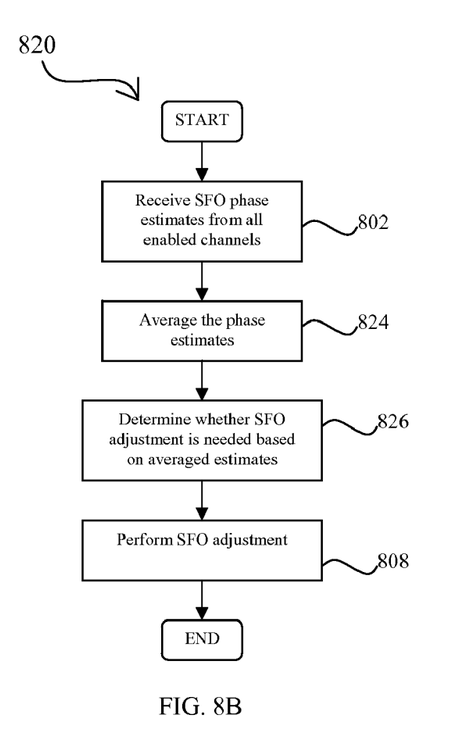
FIG. 8B is a flowchart illustrating a second method of performing multi-channel sampling frequency offset adjustment.

FIG. 8B is a flowchart illustrating a second method 820 of combining SFO phase estimates in the master SFO feedback control block 550. SFO phase estimates from each enabled channel are received 802 by the master SFO feedback control block 550. The phase estimates are averaged 824 using a simple average or a weighted average. A determination is made as to whether a SFO adjustment is needed based on the average phase estimate 826 using any method desired, such as that described in U.S. patent application Ser. No. 11/467,158. The SFO adjustment is then performed 808, and then the method ends.

Figure 9:
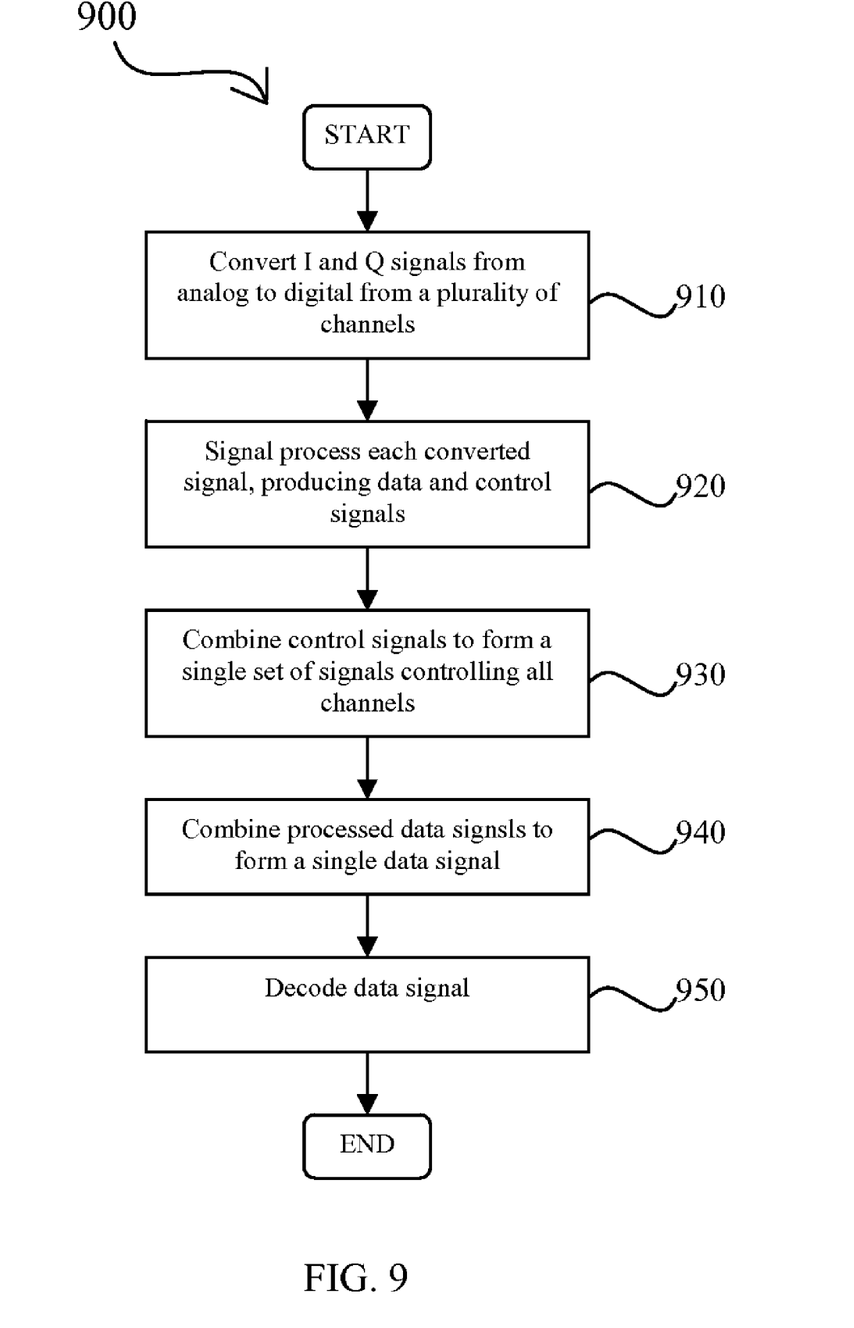
FIG. 9 is a flowchart illustrating a method of receiving signals.

FIG. 9 is a flowchart illustrating a method 900 of receiving signals. In an embodiment of the invention, the receiver 200 can perform the method 900. For a plurality of channels, an in-phase (I) signal and a quadrature (Q) signal are converted (910) from analog to digital. The converted signals are then signal processed (920), producing data and control signals. After the processing, the control signals are combined (930) to produce a set of master controls to the receiver. The processed data signals from each channel are combined (940), and the combined signals are decoded (950). The method 900 then ends.

The foregoing description of the illustrated embodiments of the present invention is by way of example only, and other variations and modifications of the above-described embodiments and methods are possible in light of the foregoing teaching. For example, while the above embodiments are described with reference to ultra wideband, the embodiments may also be used with other wireless technologies. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A receiver, comprising:
a plurality of channels for receiving a signal, wherein each channel receives the signal independently, each channel having an analog-to-digital converter for an in phase (I) signal of the received signal and an analog-to-digital converter for a quadrature (Q) signal of the received signal;
each channel further having a signal processing block coupled to the I and Q analog-to-digital converters; and
a data combiner coupled to the signal processing blocks of each channel, that combines the I signals from each channel and combines the Q signals from each channel
wherein the signal processing blocks are further coupled to a controller, the controller comprising a combiner that combines incoming correlation values from the plurality of channels
wherein the controller further includes a master symbol sync, a master frame sync coupled to the master symbol sync, and a master sampling frequency offset feedback control coupled to the master frame sync;
wherein the master symbol sync process incoming symbol synchronization correlations values from the plurality of channels to produce symbol boundary and packet detection control information;
wherein the master frame sync determines a start of channel estimation symbols, header symbols and data symbols with a received packet;
wherein the master sampling frequency offset feedback control provides control information to a symbol sync of the signal processing block and a phase locked loop that drives a clock using sampling frequency offset estimates from each channel.

2. The receiver of claim 1, wherein the values from the plurality of channels are selectable.

3. The receiver of claim 2, wherein the selection is based on signal-to-noise ratio of the channels.

4. The receiver of claim 1, wherein data combiner combines the signals using a weighted average based on the SNR of the signals.

5. The receiver of claim 1, wherein the data combiner combines the signals using a simple average.

6. The receiver of claim 1, wherein the data combiner combines values from enabled channels of the plurality of channels.

7. The receiver of claim 1, wherein the plurality of channels includes three channels.

8. The receiver of claim 1, further comprising a decoder coupled to the data combiner that reverses encoding functions of a transmitter.

9. The receiver of claim 1, wherein the signal processing block shares a fast Fourier transform with a transmitter.

10. The receiver of claim 4, wherein the data combiner is located after the signal processing blocks.

11. The receiver of claim 1, wherein each signal processing block includes a channel equalizer.

12. A method, comprising:
receiving a signal;
for a plurality of channels, each of which receives the signal independently,
converting from analog to digital an in-phase (I) signal of the received
signal and a quadrature (Q) signal of the received signal;
signal processing each converted signal; and
after the processing, combining the I signals from each channel and combining the Q signals from each channel;
combining, by a combiner in a controller, incoming correlation values from the plurality of channels;
processing, by the controller, incoming symbol synchronization correlations values from the plurality of channels to produce symbol boundary and packet detection control information;
determining, by the controller, a start of channel estimation symbols, header symbols and data symbols with a received packet; and
providing, by the controller, control information for the signal processing and to a phase locked loop that drives a clock using sampling frequency offset estimates from each channel.

13. The method of claim 12, wherein the values from the plurality of channels are selectable.

14. The method of claim 13, wherein the selection is based on signal-to-noise ratio of the channels.

15. The method of claim 12, wherein the combiner combines the signals using a simple average.

16. The method of claim 12, wherein the plurality of channels includes three channels.

17. The method of claim 12, further comprising reversing encoding functions of a transmitter.

* * * * *